United States Patent [19]
Hasegawa et al.

[11] Patent Number: 5,152,361
[45] Date of Patent: Oct. 6, 1992

[54] MOTORCYCLE

[75] Inventors: Takashi Hasegawa, Tokyo; Yutaka Machida, Saitama; Akira Hayashi, Tokyo; Hirokazu Komuro, Saitama; Michio Asumi, Saitama; Isamu Takahashi, Saitama, all of Japan

[73] Assignee: Honda Giken Kogyo Kabushiki Kaisha, Tokyo, Japan

[21] Appl. No.: 585,787

[22] Filed: Sep. 20, 1990

[30] Foreign Application Priority Data

Sep. 22, 1989 [JP] Japan .................................. 1-246764
Sep. 3, 1990 [JP] Japan .................................. 2-232674

[51] Int. Cl.⁵ ...................... B62D 61/02; B62K 11/00; B62M 9/04
[52] U.S. Cl. .................................. 180/230; 180/227; 180/229; 474/13
[58] Field of Search ............... 180/230, 219, 231, 227, 180/229; 474/13, 11, 70; 123/73 A, 98 R

[56] References Cited

U.S. PATENT DOCUMENTS

| | | | |
|---|---|---|---|
| 4,344,500 | 8/1982 | Kurata et al. | 180/230 |
| 4,345,664 | 8/1982 | Anno et al. | 180/230 |
| 4,497,285 | 2/1985 | Kondo | 180/229 X |
| 4,531,928 | 7/1985 | Ikenoya | 180/229 X |
| 4,723,619 | 2/1988 | Yamamoto et al. | 180/219 |
| 4,733,639 | 3/1988 | Kohyama et al. | 180/229 X |
| 4,887,488 | 12/1989 | Miyazaki | 180/230 X |
| 4,903,483 | 2/1990 | Atsuumi et al. | 180/219 X |
| 4,924,819 | 5/1990 | Boyesen | 123/65 PE |

Primary Examiner—Charles A. Marmor
Assistant Examiner—Kevin Hurley
Attorney, Agent, or Firm—Lyon & Lyon

[57] ABSTRACT

An automatic centrifugal clutch is arranged at the rear of an engine of a motorcycle, and a belt type continuously variable transmission and a gear type speed reduction device are arranged on opposite sides of the clutch whereby a space at the rear of the engine is effectively utilized, and a space for installing a kick starter is secured externally of the belt type continuously variable transmission. An output shaft of a reduction device and an intermediate shaft of the reduction device are arranged on opposite sides of a plane extending so as to include axes of a crankshaft and an input shaft whereby the longitudinal length of a power transmission device is shortened. An opening of a cooling air discharge passage is provided to face the automatic centrifugal clutch at the front end of the reduction device whereby the automatic centrifugal clutch can be effectively cooled while effectively utilizing the space. Two mating surfaces formed in the case means are offset from each other, whereby the space within the case means can be effectively utilized. Furthermore, a reed valve and a starter motor are arranged with the crankshaft interposed therebetween on a crank case whereby there is secured a space for efficiently arranging an intake system leading to the reed valve.

9 Claims, 7 Drawing Sheets

MOTORCYCLE

BACKGROUND OF THE INVENTION

1. FIELD OF THE INVENTION

The present invention relates to a motorcycle having a power transmission device provided with a belt type continuously variable transmission and an engine suitable for use with the power transmission device.

2. Description of the Prior Art

There has conventionally been known, for example, from Japanese Utility Model Application Laid-Open (Kokai) No. 62-165471 (165471/87), a motorcycle having a power transmission device provided with a belt type continuously variable transmission having a drive pulley provided on a crankshaft and a driven pulley provided on an input shaft of a speed reduction device which pulleys are together connected by a belt. In such a conventional power transmission device for the motorcycle, a power transmission case thereof is necessary to include therein various apparatuses such as an automatic centrifugal clutch, a gear type speed reduction device, a kick starter, a cooling mechanism and the like in addition to the belt type continuously variable transmission having the pulleys. Therefore, contrary to a demand that the power transmission device should be compact, the outside dimension thereof inevitably tends to become larger. It is therefore necessary that various apparatuses including the engine are rationally arranged to thereby effectively utilize the space and form the power transmission device compactly.

Furthermore, in an engine for the motorcycle, use of a starter motor as a starting device thereof has been well known, for example, from Japanese Patent Application Laid-Open (Kokai) No. 62-289493 (289493/87). Incidentally, in the case where the engine as described is mounted on the motorcycle, there is a problem that the characteristics of the engine cannot fully be exhibited because an intake system such as a reed valve, a carburetor or the like interferes with the starting device to render a layout difficult, and freedom of designing the intake system is impaired. It has been therefore desired to rationally layout the intake system and the starting device of the engine thereby increasing the effective utilization of the space and the freedom of designing the intake system.

SUMMARY OF THE INVENTION

The present invention has been accomplished in view of the aforementioned circumstances. It is an object of the present invention to provide a motorcycle which can respond to the above-described demands.

For achieving the aforesaid object, according to a first feature of the present invention, there is provided a motorcycle comprising an engine and a power transmission device including a belt type continuously variable transmission having a drive pulley provided on a crankshaft of the engine and a driven pulley provided on an input shaft of a gear type speed reduction device for driving a rear wheel at a reduced speed, both the pulleys being connected by a belt, wherein an automatic centrifugal clutch is disposed rearwardly of said engine between the driven pulley of the input shaft and the gear type speed reduction device, and a kick starter is disposed on an opposite side the driven pulley with respect to the automatic centrifugal clutch.

According to the aforementioned first feature, the speed reduction device is disposed on one side of the automatic centrifugal clutch positioned at the rear of the engine and the belt type continuously variable transmission is disposed on the other side. Therefore, the position of the belt type continuously variable transmission can be disposed closer to the center of the engine. As a result, and in this space the kick starter can be disposed to thereby shorten the width of the power transmission device.

In addition to the aforementioned first feature, it may be arranged that the driven pulley comprises a stationary pulley half provided on an inner sleeve capable of being connected to the kick starter, a movable pulley half provided on an outer sleeve loosely fitted around an outer periphery of the inner sleeve and a spring for urging said movable pulley half toward the stationary pulley half, and wherein a pin projected from the outer periphery of the inner sleeve is capable of engaging a cam groove formed in the outer sleeve to cause the movable pulley half to move toward the stationary pulley half through relative rotation of both the pulley halves produced when a large torque is transmitted. Therefore, when a heavy load acts between the driven pulley and the belt at the time of operating or starting the kick starter, or at the time of operating the engine brake, the movable pulley half of the driven pulley is pressed against the stationary pulley half to prevent the belt from being slipped.

According to a second feature of the present invention, there is provided a motorcycle comprising an engine and a power transmission device including a belt type continuously variable transmission having a drive pulley provided on a crankshaft of the engine and a driven pulley provided on an input shaft of a gear type speed reduction device for driving a rear wheel at a reduced speed, both the pulleys being connected by a belt, wherein an automatic centrifugal clutch is disposed rearwardly of the engine between the driven pulley of the input shaft and the gear type speed reduction device, the automatic centrifugal clutch comprising a starting clutch and an engine brake clutch disposed adjacent to each other.

According to the aforementioned second feature, since the automatic centrifugal clutch is to be disposed in a space which is produced between the belt type continuously variable transmission and the gear type speed reduction device at the rear portion of the engine, and since the automatic centrifugal clutch comprises the starting clutch and the engine brake clutch which are located adjacent to each other, the space at the rear portion of the engine can be effectively utilized and the power transmission device can be made compact as a whole.

According to a third feature of the present invention, there is provided a motorcycle comprising an engine and a power transmission device wherein including a crankshaft of the engine, and an input shaft, an intermediate shaft and an output shaft of a gear type speed reduction device for driving a rear wheel at a reduced speed, are disposed sequentially from front to rear sides of a vehicle body, the crankshaft and the input shaft being connected by a belt type continuously variable transmission, and wherein the intermediate shaft is disposed on one side of a plane extending in a longitudinal direction of the vehicle body and including axis of the crankshaft and the input shaft, and the output shaft is disposed on the other side of the plane.

According to the aforementioned third feature, since the intermediate shaft and the output shaft of the reduction device are disposed on one side and the other side, respectively, of the plane extending in a longitudinal direction of the vehicle body and including the axes of the crankshaft of the engine and the input shaft of the reduction device, the distance in a longitudinal direction of the vehicle body between said input shaft and the output shaft of the speed reduction device can be made shorter than the sum of the distance between the input shaft and the intermediate shaft and the distance between the intermediate shaft and the output shaft of the speed reduction device. Thereby, the overall length of the power transmission device can be shortened, and the freedom for mounting the power unit with respect to the vehicle body can be increased.

According to a fourth feature of the present invention, there is provided a motorcycle comprising and engine and a power transmission device including an automatic centrifugal clutch provided adjacent to a belt type continuously variable transmission which is provided on one side of the engine, the belt type continuously transmission and the automatic centrifugal clutch being received in a transmission case, and a fan for introducing a cooling air is provided at a back of a face driven pulley of said belt type continuously variable transmission, wherein an opening of a discharge passage for the cooling air is formed, at that surface of a wall defining the continuously variable transmission chamber which faces the automatic centrifugal clutch.

According to the aforementioned fourth feature, since the opening of the discharge passage of the cooling air is formed facing the automatic centrifugal clutch, the cooling air discharged out of the transmission case passes through around the automatic centrifugal clutch laterally without fail, thus improving the cooling effect of the automatic centrifugal clutch. Furthermore, the fan for introducing the cooling air is provided on the driven pulley side, and the rotational speed of the driven pulley substantially corresponds to the vehicle speed except idling operation. Thus, more cooling air can be introduced in response to an increase of the vehicle speed.

Moreover, in addition to the aforementioned fourth feature, in a case where a gear type speed reduction device for driving a rear wheel at a reduced speed is provided sidewardly of the belt type continuously variable transmission and the discharge passage for the cooling air is disposed at a front end portion of the gear type speed reduction device. The front space of the gear type speed reduction device which has been originally a dead space can be effectively utilized to provide a compact layout.

According to a fifth feature of the present invention there is provided a motorcycle comprising an engine and a case means having first, second and third portions, the first portion being on one side of the case means and supporting through respective bearings a crankshaft having a drive pulley provide thereon and an input shaft of a gear type speed reduction device for driving a rear wheel at a reduced speed, and having a driven pulley provided thereon the second portion being on the other side of the case means and cooperating with the first portion to support the crankshaft, and the third portion of the case means cooperating with the first portion to receive the gear type speed reduction device, wherein a mating surface between the first and third portions of the case means is offset toward the other side with respect to a mating surface between said first and second portions of the case means.

According to the aforementioned fifth feature, since the mating surface between the first and third portions of the case means is made offset with respect to the mating surface between the first and second portions of the case means, spaces serving as a crank chamber and a clutch chamber can be sufficiently secured and the width of the whole case means can be reduced. Therefore, the whole engine can be made compact. Furthermore, since the third portion of the case means providing a partition wall for the gear type speed reduction device is separately formed, maintenances of the crank chamber and the gear type speed reduction device chamber can be carried out independently of each other.

According to a sixth feature of the present invention, there is provided a motorcycle comprising an engine having a crankcase provided with a reed valve and a starter motor, wherein the reed valve is disposed rearwardly of a cylinder of the engine, and the starter motor is disposed at a position opposed to the reed valve with a crankshaft supported on the crank case being interposed therebetween.

According to the aforementioned sixth feature, since the reed valve is disposed on the crank case rearwardly of the cylinder and the starter motor is disposed on the crank case at a position opposed to said reed valve with the crankshaft within the crank case being sandwiched therebetween, a space for installing intake system members such as a carburetor, an air cleaner and the like in communication with the reed valve can be secured to increase the freedom of the layout.

BRIEF DESCRIPTION OF THE DRAWINGS

FIGS. 1 to 8 show a first embodiment of the present invention where

DESCRIPTION OF THE PREFERRED EMBODIMENTS

Embodiments of the present invention will be described hereinafter with reference to the drawings.

Figure 1:
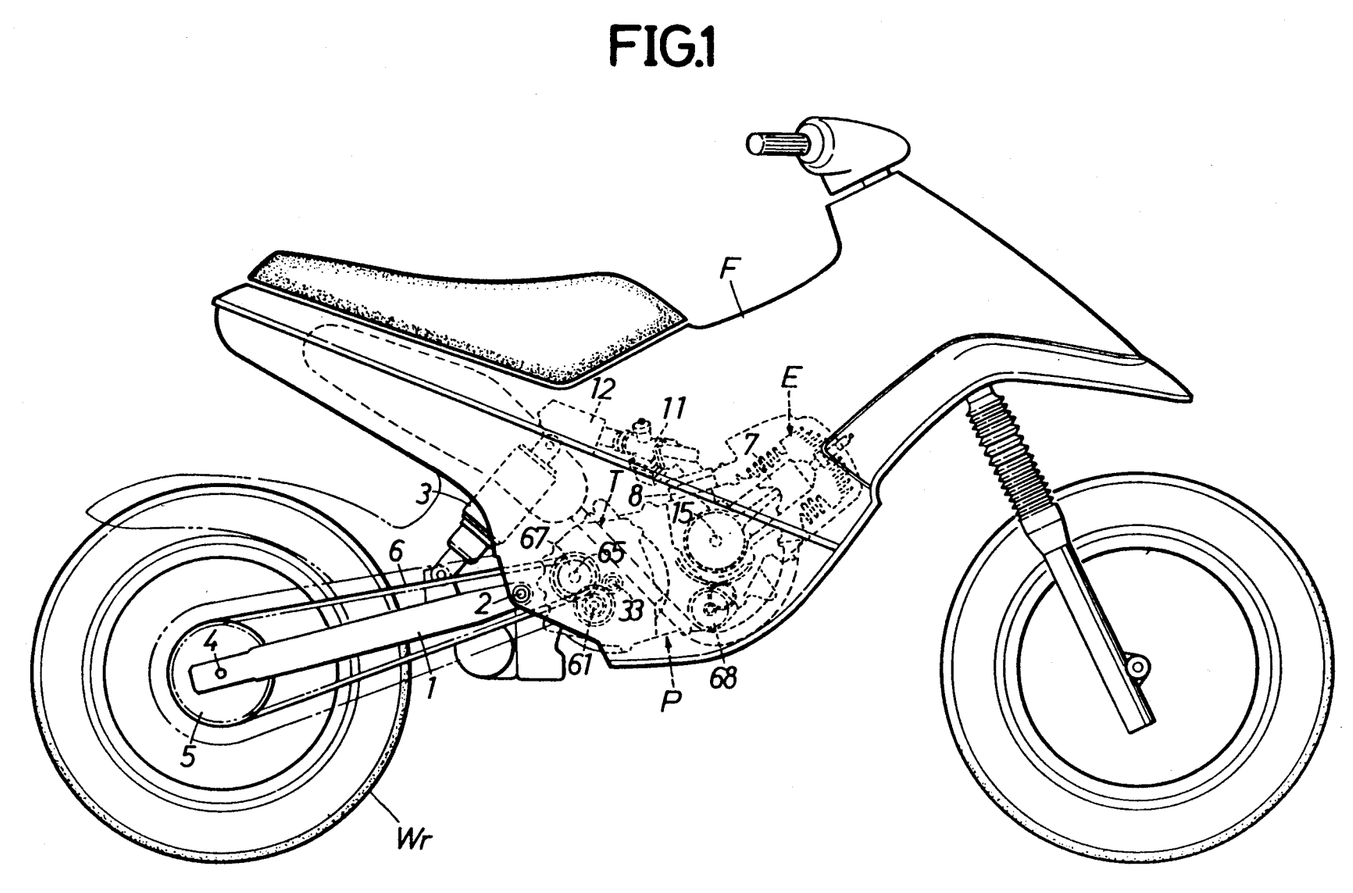
FIG. 1 is a side view of the whole motorcycle to which the present power transmission device is applied.

As shown in FIG. 1, in a motorcycle according to a first embodiment, a power unit P having an engine E and a transmission case T is provided in the central portion of a body frame F. A rear fork 1 is vertically swingably supported by a pivot pin 2 at the rear of the body frame F, and a rear cushion 3 is mounted between the rear fork 1 and the body frame F. A rear wheel Wr supported on the rear end of the rear fork 1 through an axle 4 is connected to the power unit P through a chain 6 wound around a driven sprocket 5 secured to the axle 4.

Figure 2:
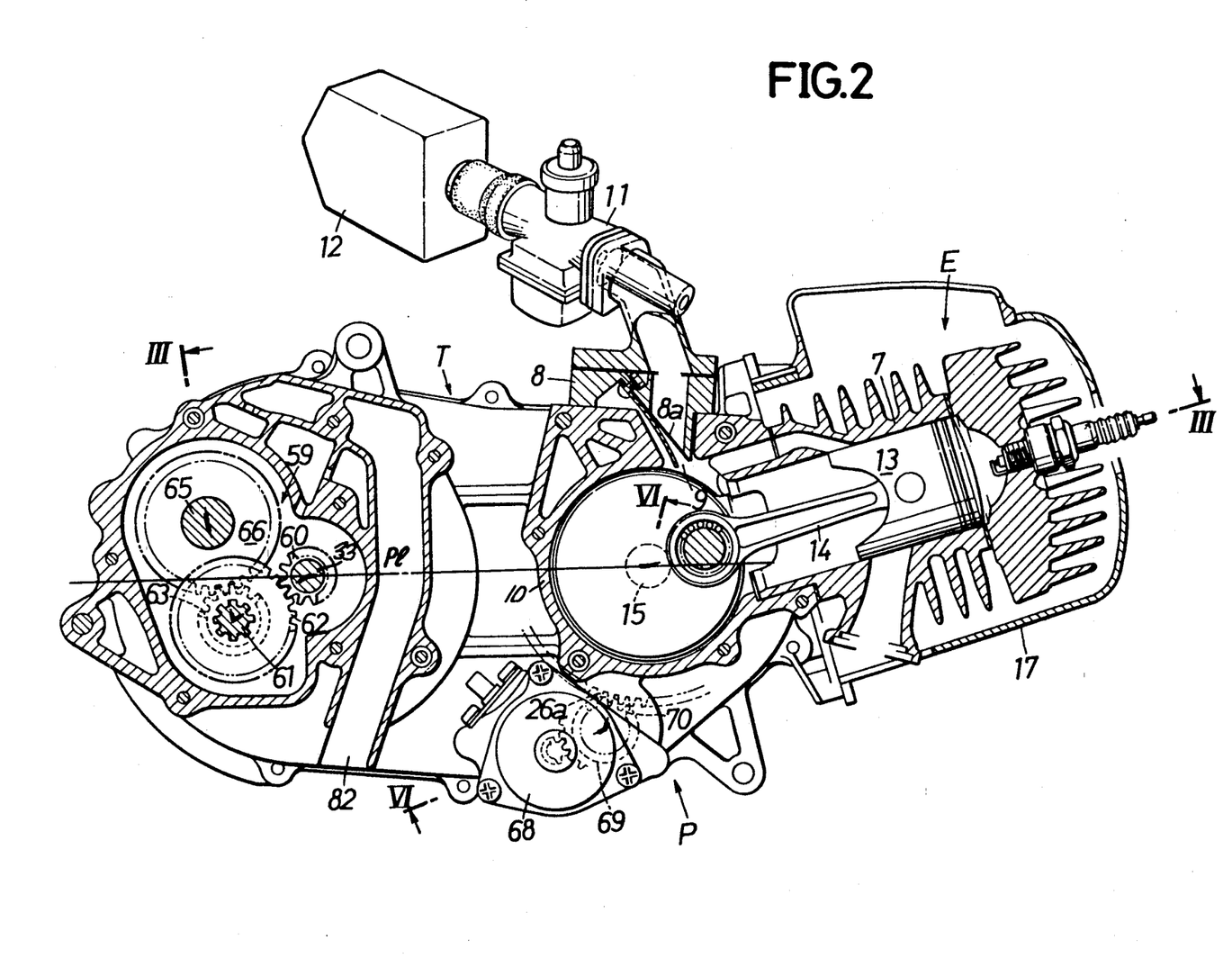
FIG. 2 is an enlarged sectional view showing essential parts of FIG. 1.
Figure 3:
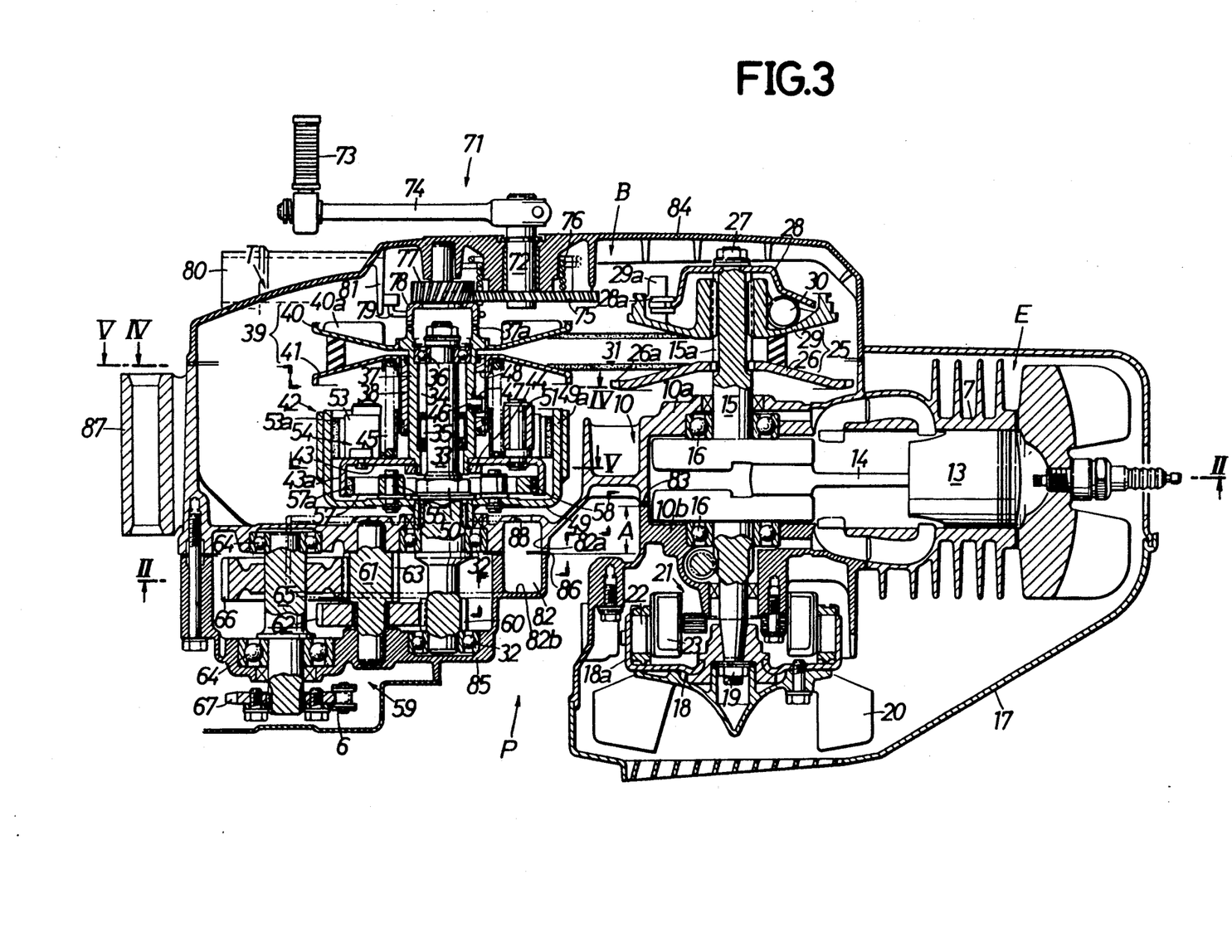
FIG. 3 is a sectional view taken on line III—III of FIG. 2.

As shown in FIGS. 2 and 3, the engine E of the power unit P is a 2-cycle back intake case reed valve type engine, and a cylinder 7 of the engine is mounted frontwardly of the transmission case T in a state where the cylinder 7 is inclined forwardly and upwardly. A reed valve 8 is mounted on the upper wall surface of a crank case 10 located at the back of the cylinder 7 so that a valve body 8a of the valve 8 may extend into an interior of an intake port 9. A volume of a crank chamber is minimized by the above arrangement of the valve body 8a of the reed valve 8. A carburetor 11 and an air cleaner 12 are disposed at an upstream side of the reed valve 8 so as to be positioned in a space formed between the rearwardly extending transmission case T and the forwardly and upwardly inclining cylinder 7. A crankshaft 15 connected through a connecting rod 14 to a piston 13 slidably fitted into the cylinder 7 of the engine E is supported on the transmission case T in a lateral direction of the body through a pair of ball bearings 16 and 16.

A flywheel 18 is secured by means of a nut 19 to the right end of the crankshaft 15 projected from the crank case 10 into an engine cover 17 in a right direction. A fan 20 for cooling the engine E is integrally secured to the external surface of the flywheel 18, and a magnet 22 of a generator 21 is mounted on the internal surface of a flange 18a formed at an outer periphery of the flywheel 18 so as to encircle an outer periphery of a stator coil 23.

On the crankshaft 15 projected from the crank case 10 into the transmission case T in a left direction is formed with a spline 15a, and a stationary pulley half 26 of a drive pulley 25 of a belt type continuously variable transmission B is fitted into the crankshaft 15 to be secured to the right end of the spline 15a. A ramp plate 28 is secured to the left end of the crankshaft 15 by a fastening force of a nut 27 so that the plate 28 cannot be rotated relative to the crankshaft 15, and a slide piece 28a provided at an outer end of the plate 28 is slidably engaged with a guide piece 29a formed axially of a movable pulley half 29 of the drive pulley 25 supported relatively non-rotatably and axially slidably with respect to the spline 15a formed in the crankshaft 15. Thereby, the ramp plate 28 rotates integrally with the movable pulley half 29 while permitting axial sliding movement of the movable pulley half 29 on the crankshaft 15. A centrifugal weight 30 is received in a space which is tapered radially outwardly and formed between the movable pulley half 29 and the ramp plate 28 so that when the rotational speed of the crankshaft 15 rises to increase the centrifugal force acting on the centrifugal weight 30, the movable pulley half 29 pressed by the centrifugal weight 30 moving radially outwardly in the tapered space is moved to the right side to decrease the distance between the movable and stationary halves 29 and 26 so as to move a belt 31 having a V-shape section held between both the pulley halves 26 and 29 toward the radial outside.

An input shaft 33 of a gear type speed reduction device 59 is supported at a right end and at a central portion thereof on a rear portion of the transmission case T through a pair of ball bearings 32. And an inner sleeve 37 is supported on a left half portion of the input shaft 33, by means of a needle bearing 35 and a ball bearing 36 provided with a grease pocket 34 sandwiched therebetween so that the inner sleeve 37 can be rotated relative to the input shaft 33 of the speed reduction device 59. An outer sleeve 38 is relatively rotatably and axially movably supported on the outer periphery of the inner sleeve 37. A stationary pulley half 40 and a movable pulley half 41 of a driven pulley 39 of the belt type continuously variable transmission B are secured to the inner sleeve 37 and the outer sleeve 38, respectively. A clutch inner member 43 of an automatic centrifugal clutch 42 is secured to the right end of the inner member sleeve 37 by means of a nut 44, and the outer sleeve 38 and the movable pulley half 41 are urged by a spring 45 mounted between the clutch inner member 43 and the movable pulley half 41 toward the stationary pulley half 40.

A mating surface 83 between a left half portion 10a as a first portion and a right half portion 10b as a second portion of the crank case 10 is formed to be offset with respect to a mating surface 86 between the left half portion 10a and a transmission case cover 85 as a third portion. That is, a difference in phase, or step A is provided between both the mating surfaces 83 and 86, and the mating surface 83 is positioned so as to provide a sufficient space for the drive pulley 25. On the side of the input shaft 33, the mating surface 86 is provided on the side more rightwardly (downwardly in FIG. 3) than the surface 83 to secure a sufficient space for the driven pulley 39 and the automatic centrifugal clutch 42. Since bearing positions for these components can arbitrarily be set according to the difference in phase A, the whole engine E can be made compact by reducing the space between the crankshaft 15 and the input shaft 33 of the speed reduction device 59 to the minimum. Since the transmission case cover 85 is mounted from the rear wheel Wr side, it is not necessary to remove the crank case cover 84, the automatic centrifugal clutch 42 and the like when maintenance of the gear type speed reduction drive 59 is performed.

Furthermore, since an engine hanger boss 87 is mounted on the left half portion 10a of the crank case 10 having a large width, a member or part formed into a single piece with the case and thus having a high rigidity and an excellent mounting accuracy can be used. Therefore, maintenance for the belt type continuously variable transmission B, the automatic centrifugal clutch 42, the gear type speed reduction device 59 and the like can be performed without removing the engine E.

An open air introducing passage 80 is provided on the left side of the transmission case T. Cooling air is introduced into the transmission case T through the open air introducing passage 80 provided on a wall surface of the crank case cover 84 by means of a fan 40a formed integral with the back face of the stationary pulley half 40, and is guided by an air guide rib 81 for cooling the interior of the transmission case T and discharged from a discharge passage 82. The discharge passage 82 is defined by a side wall which is opposed to the automatic centrifugal clutch 42 and extended at the front end of the speed reduction device 59. That is, the discharge passage 82 is defined by forming a recess 82a having a U-shaped section in the external surface of the side wall of the left half portion 10a of the crank case 10, forming a recess 82b having a U-shape section corresponding to the recess 82a also in the side wall of the transmission case cover 85, and bringing both the recesses 82a and 82b into conformance with each other when the left half portion 10a and the transmission case cover 85 are bolted together. The discharge passage 82 is closed at its upper end and opened at its lower end, and is communicated with the belt type continuously variable transmission B through an opening 88 formed so as to face the automatic centrifugal clutch 42.

Figure 7:
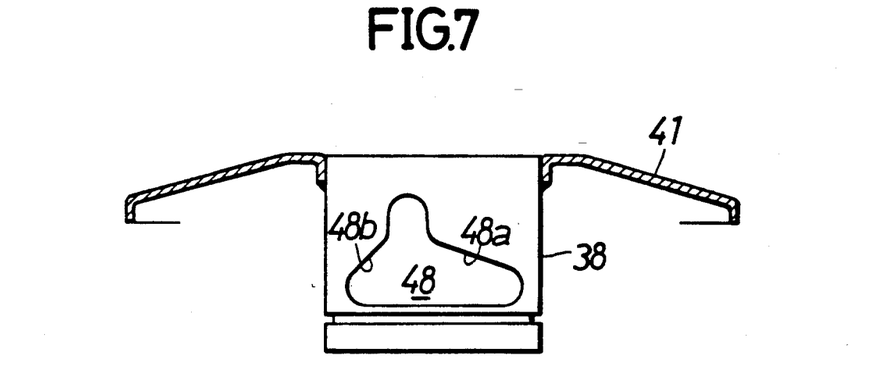
FIG. 7 is a side view of a movable pulley half of a driven pulley.

As shown in FIG. 7, three pins 46 are implanted radially outwardly in a peripheral surface of the inner sleeve 37 with circumferential spacings therebetween, and a roller 47 provided at a tip end of each of the pins 46 engages with a corresponding one of these cam grooves 48 formed in a peripheral surface of the outer sleeve 38 with circumferential spacings therebetween (only one pin 46 and one groove 48 being shown herein). As will be apparent from FIG. 8, the cam groove 48 has an approximately triangular shape so that a starting cam surface 48a inclined circumferentially of the outer sleeve 38 is formed between a first position P1 and a third position P3 (advance side of rotational direction), and a travelling cam surface 48b inclined circumferentially of the outer sleeve 38 is formed between a second position P2 and the third position P3 (lag side of rotational direction).

Figure 4:
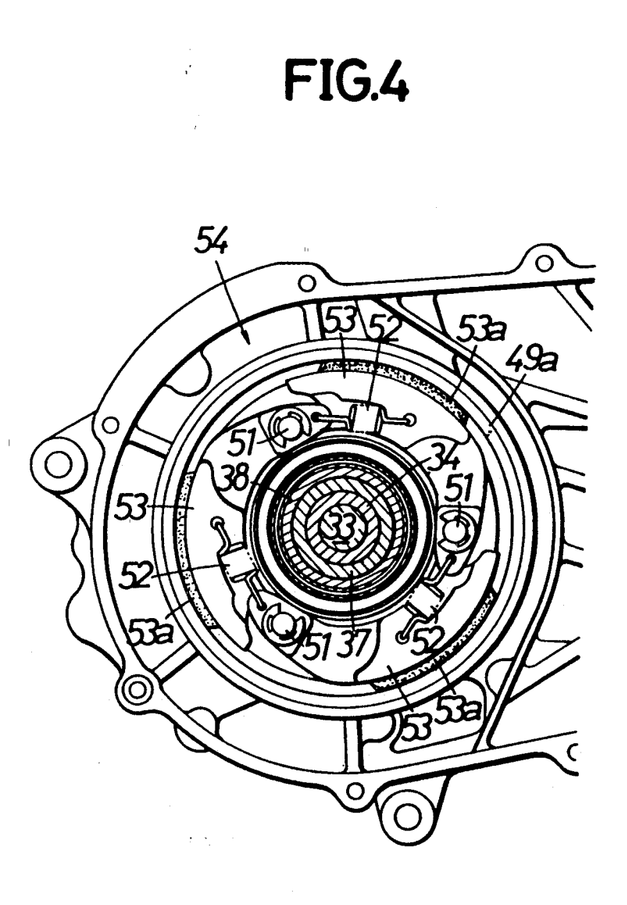
FIG. 4 is a sectional view taken on line IV—IV of FIG. 3.
Figure 5:
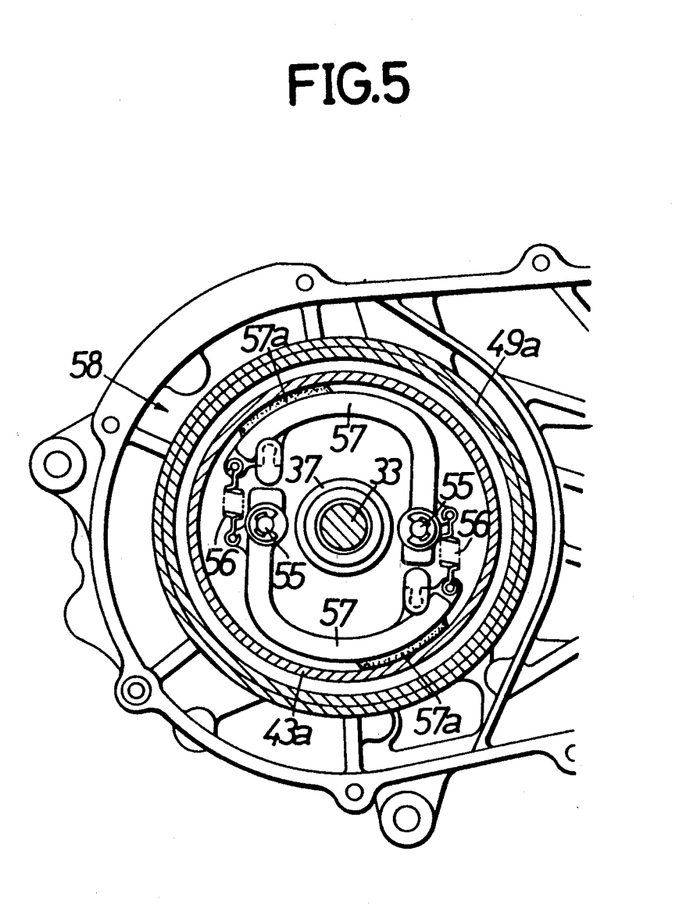
FIG. 5 is a sectional view taken on line V—V of FIG. 3.

At the rear of the engine E, the automatic centrifugal clutch 42 is disposed in a space interposed between the belt type continuously variable transmission B and the speed reduction device 59 which will be described in detail later. That is, a clutch outer member 49 positioned externally of the clutch inner 43 is splined fitted to an intermediate portion of the input shaft 33 of the speed reduction device 59 and secured thereto by means of a nut 50. As will be apparent from FIG. 4, a friction member 53a opposed to the inner peripheral surface of a flange 49a of the clutch outer member 49 is mounted on each of three clutch weights 53 each pivotally supported by a pin 51 on the side wall of the clutch inner member 43 and is urged radially inwardly by means of a spring 52 to constitute a starting clutch 54. On the other hand, a friction member 57a opposed to the inner peripheral surface of a flange 43a of the clutch inner member 43 is mounted on each of two clutch weights 57 each pivotally supported by a pin 55 on the side wall of the clutch outer member 49 and is urged radially inwardly by means of a spring 56 to constitute an engine brake clutch 58, as will be apparent from FIG. 5. Accordingly, as will be apparent from FIG. 3, the starting clutch 54 is disposed on the driven pulley 39 side of the input shaft 33 of the speed reduction device 59, and the engine brake clutch 58 is disposed on the opposite side of and adjacent to the starting clutch 54.

An input gear 60 formed integral with the input shaft 33 of the speed reduction device 59 is meshed with a first intermediate gear 62 spline-fitted to an intermediate shaft 61 pivotally supported at the rear of and downwardly of the input shaft 33 of the speed reduction device 59 of the transmission case T, and a second intermediate gear 63 formed integral with the intermediate shaft 61 is meshed with an output gear 66 pressed into the output shaft 65 of the speed reduction device 59 pivotally supported at the rear of and upwardly of the transmission case T by means of a pair of ball bearings 64. A drive sprocket 67 is secured to an end of the output shaft 65 of the speed reduction device 59 projected outwardly from an transmission case T, the drive sprocket 67 being connected to the driven sprocket 5 of the rear wheel Wr through the chain 6. As will be apparent from FIG. 2, the intermediate shaft 61 is disposed at the rear of and downwardly of the input shaft 33 that is, below a plane P1 which includes the axes of the crankshaft 15 and input shaft 33 and extends in the longitudinal direction of the vehicle body, and the output shaft 65 is disposed at the rear of the intermediate shaft 61 and further upwardly of the input shaft 33 that is, above the mentioned plane P1, whereby the length of the gear type speed reduction device 59 in the longitudinal direction of the vehicle body can be reduced.

Figure 6:
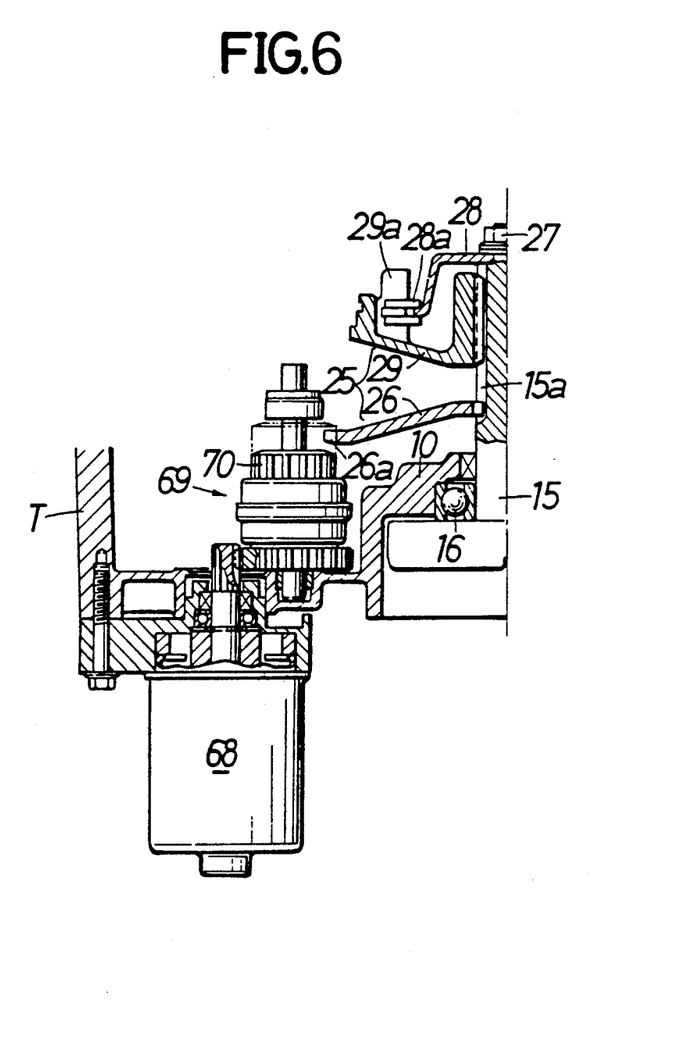
FIG. 6 is a sectional view taken on line VI—VI of FIG. 2.

As shown in FIGS. 2 and 6, a starter motor 68 mounted at the lower portion of the crank case 10 so as to oppose to the reed valve 8 with the crankshaft 15 sandwiched therebetween is connected to a known starter pinion jump-in mechanism 69 provided in the transmission case T. A starter ring gear 26a is formed in the outer periphery of the stationary pulley half 26 of the drive pulley 25 so as to be positioned in a moving course of a starter pinion 70 secured to the output shaft of the jump-in mechanism 69 and capable of being projected leftward (upward in FIG. 6). Accordingly, when the starter motor 68 is started, the starter pinion 70 of the jump-in mechanism 69 is projected leftward (upward in FIG. 6) into engagement with the starter ring gear 26a so as to rotate the crankshaft 15 securely provided with the stationary pulley half 26 which is integral with the starter ring gear 26a, and the engine E is then started.

At that time, the starter motor 68 is mounted at the lower portion of the crank case 10 whereby not only the position of the center of gravity is lowered to properly maintain the balance of the vehicle body but also the space formed at the back of the cylinder is effectively utilized for the layout of the reed valve 8, the carburetor 11 and the air cleaner 12.

On the other hand, as shown in FIG. 3, a kick starter 71 is provided at the rear of and on the left side of the transmission case T. That is, a kick arm 74 provided with a pedal 73 is secured to the outer end of a kick shaft 72 pivotally supported on the left wall of the transmission case T, and a drive helical gear 75 is secured to the inner end of the kick shaft 72. A return spring 76 is mounted between the drive helical gear 75 and the transmission case T so that the kick arm 74 may be automatically returned to its original position. The drive helical gear 75 is meshed with a driven helical gear 77 axially movably supported on the inner surface of the transmission case T. A ratchet wheel 78 secured to the inner end of the driven helical gear 77 is opposed engageably with a ratchet teeth 37a formed on the left end of the inner sleeve 37 mounted on the input shaft 33 of the speed reduction device 59. A ring-like friction spring 79 is abutted against the outer peripheral portion of the rachet wheel 78, and an end of the friction spring 79 is engaged with the air guide rib 81 formed on the inner wall of the transmission case T.

Next, the function of the aforementioned first embodiment will be described hereinafter.

When the starter motor 68 is activated, the starter pinion 70 projected through the jump-in mechanism 69 comes into engagement with the starter ring gear 26a formed in the outer periphery of the stationary pulley half 26 of the drive pulley 25 to drive the crankshaft 15 securely provided with the stationary pulley half 26, and the engine E is started.

On the other hand, starting of the engine E using the kick starter 71 is effected by kicking the pedal 73 of the kick arm 74 extending outwardly from the transmission case T to the back as viewed in FIG. 3. By kicking the pedal 73, the driven helical gear 77 meshed with the drive helical gear 75 is rotated. At that time, resistance is imparted to the rotation of the driven helical gear 77 by the friction force received from the friction spring 79 which is in sliding contact with the ratchet wheel 78, and therefore, the driven helical gear 77 is given axial thrust from the drive helical gear 75. Thereby, the driven helical gear 77 and the ratchet wheel 78 integrally move rightward, and the ratchet wheel 78 comes into engagement with the ratchet teeth 37a formed at an end surface of the inner sleeve 37. When the inner sleeve 37 rotates, the outer sleeve 38 also rotates through the pin 46 implanted in the inner sleeve 37, and the belt 31 wound around the stationary pulley half 40 and the movable pulley half 41 of the driven pulley 39 secured to both the sleeves 37 and 38 is driven. The rotation of the belt 31 is transmitted to the drive pulley 25, and the crankshaft 15 on which the drive pulley 25 is supported rotates whereby the engine E starts. When the engine E starts and the driven pulley 39 starts to rotate, the ratchet wheel 78 is filliped off by the ratchet teeth 37a formed at the inner sleeve 37 and is moved away from the teeth 37a, and the kick arm 74 is returned to its original position by the return spring 76.

Figure 8:
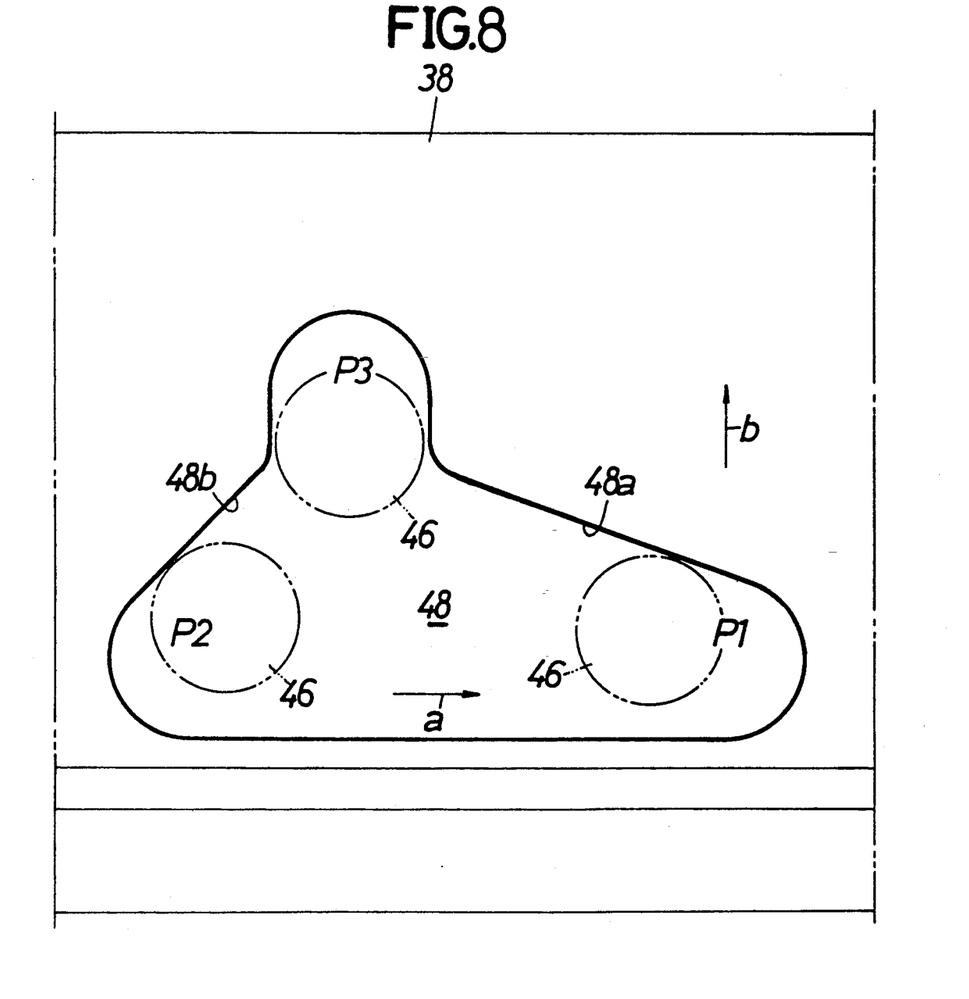
FIG. 8 is an enlarged view of a cam groove.

When the engine E is started by the kick starter 71, the drive force of the kick arm 74 is first transmitted to the inner sleeve 37 to drive the pin 46 implanted in the inner sleeve 37 in a direction indicated by an arrow a in FIG. 8. Thereby, the pin 46 comes into contact with the starting cam surface 48a of the cam groove 48 formed in the outer sleeve 38 and moves toward the first position P1 while pressing the outer sleeve 38 in a direction indicated by an arrow b, and the rotation of the inner sleeve 37 is transmitted to the outer sleeve 38. In this manner, the movable pulley half 41 is pressed in a direction indicated by the arrow b so as to come close to the stationary pulley half 40 whereby the belt 31 is held under pressure between both the pulley halves 40 and 41 to prevent an occurrence of a slip to enable a smooth start of the engine E. The aforesaid function is effected even in the case where the stationary pulley half 40 of the driven pulley 39 is rotated prior to the movable pulley half 41 by the operation of the engine brake, and the belt 31 can be prevented from being slipped.

When the engine E starts, the rotation of the crankshaft 15 is transmitted from the drive pulley 25 of the belt type continuously variable transmission B to the driven pulley 39. At that time, the drive force of the belt 31 is first transmitted to the movable pulley half 41 of the driven pulley 39 having a smaller load. Therefore, as shown in FIG. 8, the movable pulley half 41 rotates in a direction indicated by the arrow a, and the pin 46 implanted in the inner sleeve 37 comes into contact with the travelling cam surface 48b of the cam groove 48 and moves toward the second position P2 while pressing the outer sleeve 38 in a direction indicated by the arrow b, and the rotation of the outer sleeve 38 is transmitted to the inner sleeve 37. Also in this case, the movable pulley half 41 is pressed in a direction indicated by the arrow b so as to come close to the stationary pulley half 40, similarly to that as described hereinabove, whereby the belt 31 is held under pressure between both the pulley halves 40 and 41 to prevent the belt from being slipped. Thus, the power can smoothly be transmitted even under a large loading condition such as when starting or ascending an upward slope.

As will be apparent from FIG. 8, an angle of inclination of the starting cam surface 48a with respect to the rotational direction of the outer sleeve 38 (the direction indicated by the arrow a) is set smaller than that of the travelling cam surface 48b. Thereby, the force for holding the belt 31 at the time of start where the slip of the belt 31 mostly tends to occur is sufficiently enhanced, and the movement of the pin 46 from the second position P2 to a third position P3 described later is not prevented.

When the inner sleeve 37 is rotated by the drive force transmitted to the driven pulley 39 as mentioned above, the clutch inner member 43 of the automatic centrifugal clutch 42 secured to the inner sleeve 37 rotates. Then, the clutch weight 53 pivotally supported on the clutch inner member 43 is spread by the centrifugal force against the spring 52, and the friction member 53a comes into contact with the inner surface of the flange 49a of the clutch outer member 49, and thereby the drive force is transmitted to the clutch outer member 49. The rotation of the clutch outer member 49 is transmitted to the input shaft 33 of the speed reduction device 59 into which the clutch outer member 49 is splinefitted, and the rotation of the input gear 60 is transmitted to the first and second intermediate gears 62 and 63 secured to the intermediate shaft 61 and the output gear 66 secured to the output shaft 65 of the speed reduction device. Then, the rotation of the output shaft 65 of the speed reduction device is transmitted to the rear wheel Wr through the drive sprocket 67, the chain 6 and the driven sprocket 5.

When the rotation of the engine E gradually increases, the centrifugal weight 30 mounted on the movable pulley half 29 at the side of the drive pulley 25 of the belt type continuously variable transmission B is moved radially outwardly by the centrifugal force to move the movable pulley half 29 toward the stationary pulley half 26. Such movement of both the pulley halves 26 and 29 toward each other reduces the width of a V space formed therebetween, and the V belt 31 moves radially outwardly of the drive pulley 25. When the V belt 31 moves outwardly, the movable pulley half 41 of the driven pulley 39 is pressed by the V belt 31 to move rightward against the spring 45, and the width of the V space formed between both the pulley halves 40 and 41 is increased and the V belt 31 moves radially inwardly of the driven pulley 39. Thereby, the speed is continuously varied in a manner that the reduction ratio becomes large in the low speed rotational region of the engine E while the reduction ratio becomes small in the high speed rotational region. At the time of high speed travel in which the reduction ratio of the belt type continuously variable transmission B is smallest, the movable pulley half 41 is moved away farthest from the stationary pulley half 40 by the tension of the belt 31, and the pin 46 is stably retained at the third position P3 of the cam groove 48.

When the rotational speed of the engine E is reduced during travelling, the clutch weight 53 pivotally supported on the clutch inner member 43 is moved away from the flange 49a of the clutch outer member 49 by the resilient force of the spring 52 to interrupt the transmission of the drive force. However, since the clutch outer member 49 connected to the rear wheel Wr side is still rotating, the clutch weight 57 pivotally supported on the side wall of the clutch outer member 49 is spread against the spring 56 and the friction member 57a comes into contact with the flange 43a of the clutch inner member 43. Thereby, the rotation of the rear wheel Wr is transmitted to the engine E side so that the engine brake is actuated. At this time, since the cam surface 48a is provided so that the movable pulley half 41 approaches the stationary pulley half 40, the engine brake becomes further effective.

Figure 9:
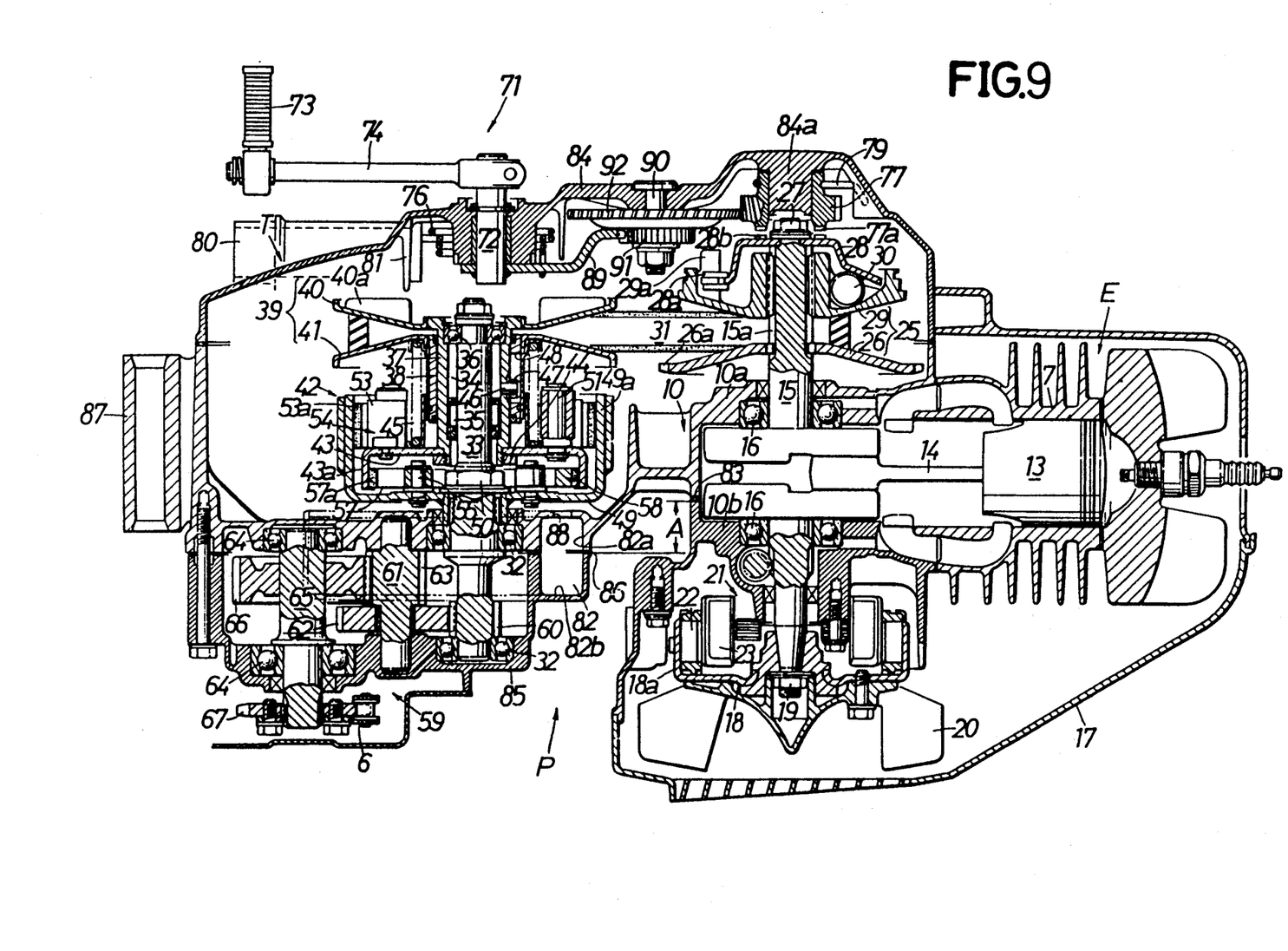
FIG. 9 shows a second embodiment and is a sectional view corresponding to FIG. 2.

FIG. 9 shows a second embodiment of the present invention. In this second embodiment, members corresponding to those in the previous first embodiment are identified by the same reference numerals and characters.

The kick starter 71 in this second embodiment is designed to drive the crankshaft 15 directly, not through the belt type continuously variable transmission B. That is, a sector gear 89 connected to the return spring 76 is secured to the kick shaft 72 pivotally supported on the crank case cover 84, the sector gear 89 being meshed with a small-diameter intermediate gear 91 supported on an intermediate shaft 90 provided in the crank case cover 84. A large-diameter intermediate gear 92 integral with the small-diameter intermediate gear 91 is a helical gear which is engaged with a driven helical gear 77 axially slidably supported on a boss 84a projected on the inner surface of the crank case cover 84 and which is braked by a friction spring 79. A ratchet teeth 77a formed at a side surface of the driven helical gear 77 is opposed to the ratchet teeth 28b formed integral with a side surface of the ramp plate 28 and is capable of engaging with the ratchet teeth 28b.

According to this embodiment, when the pedal 73 provided on the kick arm 74 is kicked, the rotation of the kick shaft 72 is transmitted at an increased rate to the helical gear 77 through the sector gear 89, the small-diameter intermediate gear 91 and the large-diameter intermediate gear 92. At this time, since the driven helical gear 77 is given a resistance against rotation by the friction spring 79, the driven helical gear 77 is given an axial thrust from the large-diameter intermediate gear 92 so that the gear 77 slidably moves along the boss 84a. As a result, the ratchet teeth 77a of the driven helical gear 77 comes into engagement with the ratchet teeth 28b of the ramp plate 28 secured to the crankshaft 15 and the engine E is started. When the engine E starts and the crankshaft 15 starts rotating, the ratchet teeth 77a of the driven helical gear 77 is fillipped off by the ratchet teeth 28b of the ramp plate 28 and is moved away from the ratchet teeth 28b, and the kick arm 74 is returned to its original position by the return spring 76.

We claim:

1. A motorcycle comprising an engine and a power transmission device including a belt type continuously variable transmission having a drive pulley provided on a crankshaft of the engine and a driven pulley provided on one of opposite ends of an input shaft of a gear type speed reduction device for driving a rear wheel at a reduced speed, said input shaft being disposed parallel to said crankshaft and both the pulleys being connected by a belt, wherein
    an automatic centrifugal clutch is disposed on an intermediate portion of said input shaft inwardly of the driven pulley and rearwardly of said engine, and a kick starter is disposed at a position outside said one end of the input shaft and on an opposite side of said driven pulley with respect to the automatic centrifugal clutch.

2. A motorcycle according to claim 1, wherein said driven pulley comprises a stationary pulley half provided on an inner sleeve capable of being connected to said kick starter, a movable pulley half provided on an outer sleeve loosely fitted around an outer periphery of said inner sleeve and a spring for urging said movable pulley half toward said stationary pulley half, and wherein a pin projected from the outer periphery of said inner sleeve is capable of engaging with a cam groove formed in the outer sleeve to cause the movable pulley half to move toward the stationary pulley half through relative rotation of both said pulley halves produced when a large torque is transmitted.

3. A motorcycle according to claim 1, wherein an output shaft of said gear type speed reduction device is associated with the other of opposite ends of the input shaft near the automatic centrifugal clutch.

4. A motorcycle comprising an engine and a power transmission device including a belt type continuously variable transmission having a drive pulley provided on a crankshaft of the engine and a driven pulley provided on one of opposite ends of an input shaft of a gear type speed reduction device for driving a rear wheel at a reduced speed, said input shaft being disposed parallel to said crankshaft and both the pulleys being connected by a belt, wherein
    an automatic centrifugal clutch is disposed on the input shaft inside of the driven pulley and rearwardly of said engine, said automatic centrifugal clutch comprising a starting clutch and an engine brake clutch disposed adjacent to each other.

5. A motorcycle according to claim 4, wherein the output shaft of said gear type reduction device is associated with the other of opposite ends of the input shaft near the automatic centrifugal clutch.

6. A motorcycle comprising an engine and a power transmission device including an automatic centrifugal clutch and a belt type continuously variable transmission which is provided on one side of the engine and adjacent to said clutch, said belt type continuously variable transmission and said automatic centrifugal clutch being received in a transmission case, wherein a fan for introducing cooling air is provided at a back face of a driven pulley of said belt type continuously variable transmission, and a discharge passage for the cooling air is formed to have an opening thereof provided in said transmission case such that the opening faces said automatic centrifugal clutch and causes the cooling air to flow across the driven pulley and the automatic centrifugal clutch laterally, a gear type speed reduction device for driving a rear wheel at a reduced speed is provided sidewardly of said belt type continuously variable transmission, and the discharge passage for said cooling air is disposed at a front end portion of said gear type speed reduction device.

7. A motorcycle comprising an engine having a crank case and a crankshaft carried on the crank case, a reed valve and a starter motor being provided on the crank case, wherein
    said reed valve is disposed rearwardly of a cylinder, and said starter motor is disposed at a position opposed to said reed valve with the crankshaft being interposed therebetween.

8. A motorcycle according to claim 7, wherein said engine is of a 2-cycle type.

9. A motorcycle comprising an engine and a power transmission device including an automatic centrifugal clutch and a belt type continuously variable transmission which is provided on one side of the engine and adjacent to said clutch, said belt type continuously variable transmission and said automatic centrifugal clutch being received in a transmission case, wherein a fan for introducing cooling air is provided at a back face of a driven pulley of said belt type continuously variable transmission, and a discharge passage for the cooling air is formed to have an opening thereof provided in said transmission case such that the opening faces said automatic centrifugal clutch and causes the cooling air to flow across the driven pulley and the automatic centrifugal clutch laterally, said driven pulley and said automatic centrifugal clutch are carried on a shaft means and an open air introducing passage is provided in said transmission case near one of opposite axial ends of said shaft means and said opening of the discharge passage is located near the other axial end of the shaft means.

* * * * *